No. 822,884. PATENTED JUNE 5, 1906.
D. W. COREY.
NEEDLE LEVER BEARING.
APPLICATION FILED APR. 7, 1904. RENEWED NOV. 21, 1905.

Witnesses
F. L. Ourand
Albert Hopkins

Inventor
Daniel W. Corey
By C. D. Sturtevant,
Attorney

UNITED STATES PATENT OFFICE.

DANIEL W. COREY, OF ST. LOUIS, MISSOURI, ASSIGNOR TO UNION SPECIAL SEWING MACHINE COMPANY, OF CHICAGO, ILLINOIS, A CORPORATION OF ILLINOIS.

NEEDLE-LEVER BEARING.

No. 822,884.  Specification of Letters Patent.  Patented June 5, 1906.

Application filed April 7, 1904. Renewed Nov. 21, 1905. Serial No. 288,457.

*To all whom it may concern:*

Be it known that I, DANIEL W. COREY, a citizen of the United States, residing at St. Louis, in the State of Missouri, have invented certain new and useful Improvements in Needle-Lever Bearings, of which the following is a description, reference being had to the accompanying drawings and to the letters of reference marked thereon.

My invention relates to an improvement in needle-lever bearings for sewing-machines, the object being to provide an arrangement capable of the greatest efficiency on high-speed machines and one which shall be continually lubricated as to all its bearing parts and not likely to wear out readily.

The invention consists, primarily, in the combination, with the needle-lever hub, of the needle-lever stud having a chamber for the reception of the lubricant and a series of circumferential openings to permit the escape of the oil to the inner periphery of the hub.

Secondly, the invention consists in the combination, with the needle-lever hub, of the needle-lever stud having a chamber for the reception of the lubricant and a series of circumferential openings to permit the escape of the oil to the inner periphery of the hub, said needle-lever hub having a groove registering with the top oil-holes in the stud.

Finally, the invention consists in the matters hereinafter described, and referred to in the appended claims.

Figure 1:
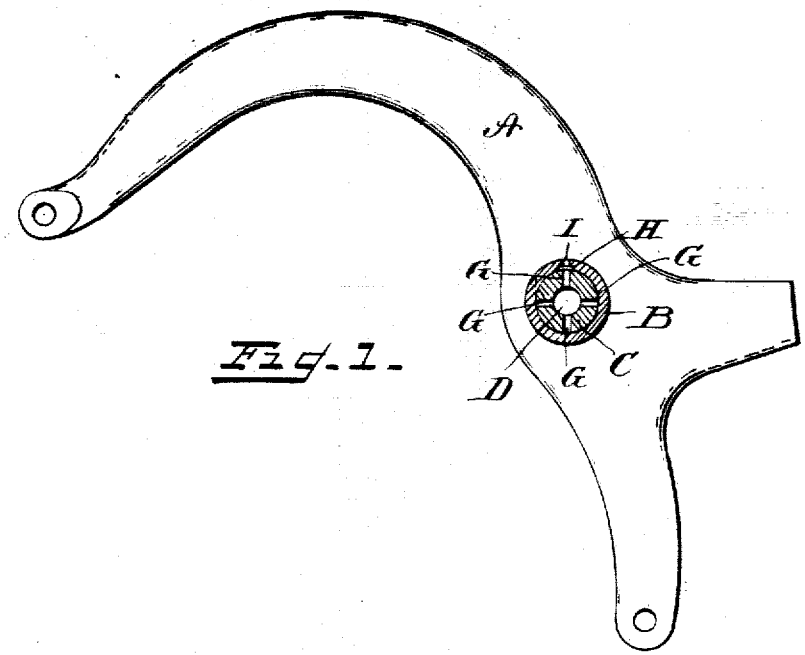
Figure 2:
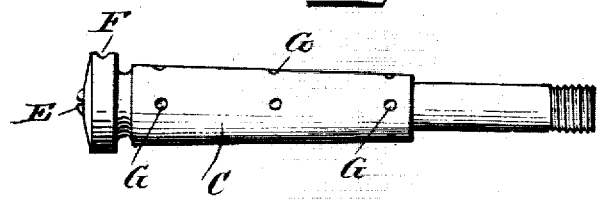
Figure 3:
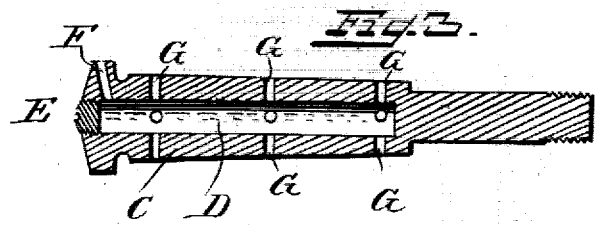

In the accompanying drawings, which illustrate the invention, Figure 1 is a front elevation of a portion of the needle-lever of a sewing-machine with the hub and stud in section. Fig. 2 is a side elevation of the needle-lever stud. Fig. 3 is a longitudinal section of the needle-lever stud.

In the drawings, A represents a portion of the needle-lever of a sewing-machine having the usual hub B, which has its bearing on the needle-lever stud C, which is screwed into the gooseneck of the machine in the usual way. The stud C is hollow, forming an oil-receiving chamber D, the outer end of which is normally closed by a threaded plug E, the plug being removed when the chamber is to be cleaned. The stud is provided with an oil-feed opening F, leading to the chamber D.

A series of circumferential holes G are formed in the needle-lever stud, and the top inner periphery of the hub is grooved, as at H, to register with the top series of holes G. From this groove holes I may lead to the outside, thus allowing escape of air when the oil is forced in. The groove H is of sufficient width, so that in the oscillation of the needle-lever the groove always registers with the oil-holes. By this arrangement a thoroughly-effective way of lubricating the bearing of the needle-lever is provided, and the trouble which at present exists on high-speed machines by the liability of wear of the needle-lever on the pivot-stud is avoided.

It will be understood that while I have shown the invention as applied in connection with needle-lever bearings said invention may be applied to other uses.

Having thus described my invention, what I claim, and desire to secure by Letters Patent, is—

1. The combination with the needle-lever hub, of the needle-lever stud having a chamber for the reception of the lubricant and a series of openings leading from the chamber to the inner wall of the hub, said needle-lever hub having a groove constantly registering with the top oil-holes in the stud; substantially as described.

2. The combination with the needle-lever hub, of the needle-lever stud having a chamber for the reception of the lubricant and a series of openings leading from the chamber to the inner wall of the hub, said stud having an end opening, with a plug for closing the same, and having independent oil-inlet and air-outlet openings; substantially as described.

3. A pivot-bearing stud, having a central hollow chamber, and openings leading therefrom, and a part to be lubricated surrounding the same, having an inner longitudinal groove to constantly register with the top set of openings; substantially as described.

4. The combination with a hub, of a supporting-bearing having a chamber for the reception of the lubricant, and provided with an oil-inlet and a series of openings leading from the chamber to the inner wall of the hub and means independent of the oil-inlet to permit the escape of air from the lubricant-chamber when the oil is forced into it.

5. The combination with a hub, of a supporting-bearing having a chamber for the reception of the lubricant, and provided with an oil-inlet and a series of openings leading from the chamber to the inner wall of the hub and an independent air-escape opening connected with the openings in the stud.

In testimony whereof I affix my signature in presence of two witnesses.

DANIEL W. COREY.

Witnesses:
ERNEST A. MUELLER,
A. E. RITER.